(12) United States Patent
Yogi et al.

(10) Patent No.: US 7,588,641 B2
(45) Date of Patent: *Sep. 15, 2009

(54) METHOD OF FORMING LIQUID-DROPS OF MIXED LIQUID, AND DEVICE FOR FORMING LIQUID-DROPS OF MIXED LIQUID

(75) Inventors: Osamu Yogi, Hamamatsu (JP); Tomonori Kawakami, Hamamatsu (JP); Mitsuru Ishikawa, Tsukuba (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 164 days.

This patent is subject to a terminal disclaimer.

(21) Appl. No.: 10/484,450

(22) PCT Filed: Aug. 28, 2002

(86) PCT No.: PCT/JP02/08672

§ 371 (c)(1),
(2), (4) Date: Jan. 21, 2004

(87) PCT Pub. No.: WO03/020418

PCT Pub. Date: Mar. 13, 2003

(65) Prior Publication Data

US 2004/0182948 A1 Sep. 23, 2004

(30) Foreign Application Priority Data

Aug. 30, 2001 (JP) .............................. 2001-261893

(51) Int. Cl.
*B05B 5/025* (2006.01)
*B05B 5/053* (2006.01)
*B05B 7/06* (2006.01)
*B05C 11/00* (2006.01)
*B41J 2/06* (2006.01)

(52) U.S. Cl. ................. 118/621; 118/665; 118/688; 118/689; 118/313; 347/55

(58) Field of Classification Search ......... 118/620–630, 118/665, 688–690, 313; 239/695–696, 102.2, 239/69; 427/479–486; 347/10, 20, 21, 43, 347/51, 55, 74, 76; 422/100; 436/180; 222/52

See application file for complete search history.

(56) References Cited

U.S. PATENT DOCUMENTS 3,060,429 A    10/1962   Winston (Continued)

FOREIGN PATENT DOCUMENTS

DE    29 49 808    12/1979

(Continued)

OTHER PUBLICATIONS

Extended Abstracts (The 50$^{th}$ Spring Meeting, 2003); The Japan Society of Applied Physics on Related Societies, Mar. 27, 2003, p. 1299.

Primary Examiner—Yewebdar T Tadesse
(74) Attorney, Agent, or Firm—Drinker Biddle & Reath LLP

(57) ABSTRACT

A droplet formation method of a mixed liquid is a method that the droplets 71, 72 and 73 are each delivered from each capillary tip to form the droplet 74 of the mixed liquid consisting of a raw material liquid on a substrate by applying a pulse voltage between the raw material liquids stored for each of a plurality of capillaries 1, 2 and 3 and the substrate disposed opposite to each capillary tip. In addition, a droplet formation device of the mixed liquid is provided with a plurality of capillaries for realizing formation of the droplet 74 of the aforementioned mixed liquid, a substrate, a voltage applying device for applying a pulse voltage and a controller for controlling the voltage applying device.

1 Claim, 11 Drawing Sheets

U.S. PATENT DOCUMENTS

| | | | |
|---|---|---|---|
| 4,160,257 A | 7/1979 | Carrish | |
| 4,263,601 A | 4/1981 | Nishimura et al. | 346/1.1 |
| 4,346,387 A | 8/1982 | Hertz | |
| 4,621,268 A | 11/1986 | Keeling et al. | 346/1.1 |
| 4,992,807 A | 2/1991 | Thomson | |
| 5,014,076 A | 5/1991 | Caley, Jr. et al. | |
| 5,528,046 A | 6/1996 | Ishikawa | 250/461.2 |
| 5,560,543 A | 10/1996 | Smith et al. | 239/102.2 |
| 5,813,614 A | 9/1998 | Coffee | 239/690 |
| 5,965,446 A | 10/1999 | Ishikawa | 436/5 |
| 6,007,630 A | 12/1999 | Pletcher et al. | |
| 6,200,013 B1 | 3/2001 | Takeuchi et al. | 366/162.4 |
| 6,242,266 B1 | 6/2001 | Schleifer et al. | 436/518 |
| 6,252,129 B1 | 6/2001 | Coffee | 602/42 |
| 6,551,839 B2 * | 4/2003 | Jovanovich et al. | 436/180 |
| 6,623,113 B2 | 9/2003 | Yamada et al. | |
| 6,764,720 B2 | 7/2004 | Pui et al. | |
| 6,796,632 B2 | 9/2004 | Yamada et al. | |
| 6,811,090 B2 | 11/2004 | Yogi et al. | |
| 6,953,551 B2 * | 10/2005 | Chen et al. | 422/100 |
| 7,247,272 B1 * | 7/2007 | Moerman et al. | 422/100 |
| 2002/0007869 A1 * | 1/2002 | Pui et al. | 141/173 |

FOREIGN PATENT DOCUMENTS

| | | |
|---|---|---|
| EP | 0 673 895 | 9/1995 |
| EP | 0 956 968 | 11/1999 |
| EP | 1 093 924 | 4/2001 |
| EP | 1 205 252 | 5/2002 |
| EP | 1 445 016 | 8/2004 |
| JP | 53-153979 | 12/1978 |
| JP | 54-51838 | 4/1979 |
| JP | 60-090853 | 5/1985 |
| JP | 62-143844 | 6/1987 |
| JP | 63-129034 | 6/1988 |
| JP | 63-129035 | 6/1988 |
| JP | 64-42140 | 3/1989 |
| JP | 1-61946 | 4/1989 |
| JP | 04-039045 | 2/1992 |
| JP | 06-148076 | 5/1994 |
| JP | 6-258328 | 9/1994 |
| JP | 08-066652 | 3/1996 |
| JP | 08-207318 | 8/1996 |
| JP | 10-185782 | 10/1996 |
| JP | 09-272207 | 10/1997 |
| JP | 11-198383 | 7/1999 |
| JP | 11-300975 | 11/1999 |
| JP | 2000-62165 | 2/2000 |
| JP | 2000-111477 | 4/2000 |
| JP | 2000-185403 | 7/2000 |
| JP | 2000-313162 | 11/2000 |
| JP | 2000-329771 | 11/2000 |
| JP | 2001-116750 | 4/2001 |
| JP | 2001-232245 | 8/2001 |
| JP | 2001-517789 | 10/2001 |
| JP | 2002-500946 | 1/2002 |
| WO | WO 99/03790 | 1/1999 |
| WO | WO 99/15876 | 4/1999 |
| WO | WO 99/37400 | 7/1999 |
| WO | WO 99/54730 | 10/1999 |
| WO | WO00/035590 | 6/2000 |
| WO | WO 01/08808 | 2/2001 |
| WO | WO 03/010418 | 2/2003 |

OTHER PUBLICATIONS

E. Litborn et al., "Parallel reactions in open chip-based nanovials with continuous compensation for solvent evaporation," *Electrophoresis*, vol. 21, Jan. 2000, pp. 91-99.

D. Shalon et al., "A DNA Microarray System for Analyzing Complex DNA Samples Using Two-color Fluorescent Probe Hybridization," *Genome Research*, vol. 6, No. 7, Jul. 1996, pp. 639-645.

Proceedings of 2002 Annual Meeting of The Institute of Electrostatics Japan, Toyohashi, Aug. 29-30, 2002.

Proceedings of International Symposium on Bio-Trace Elements 2002.

Proceedings of the 7th International Conference on Properties and Applications of Dielectric Materials, Jun. 1-5, 2003.

* cited by examiner

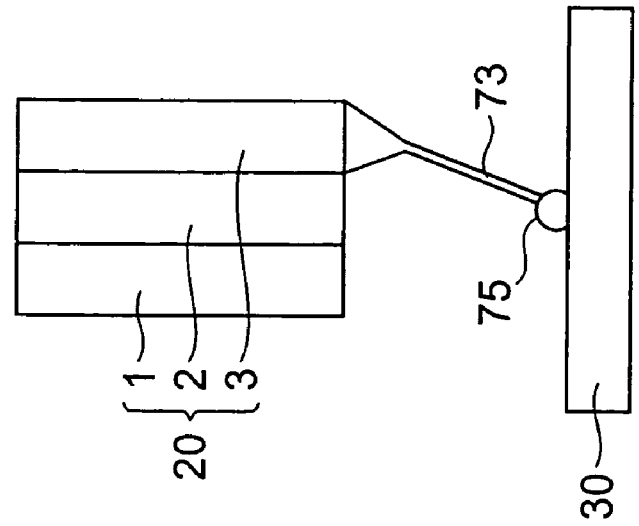
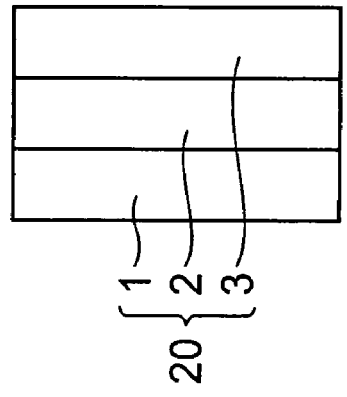
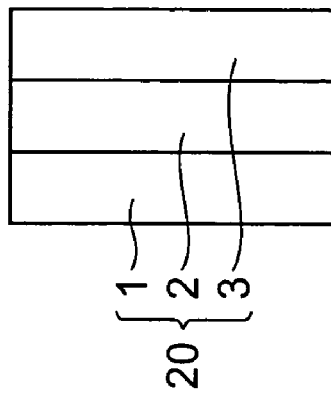

METHOD OF FORMING LIQUID-DROPS OF MIXED LIQUID, AND DEVICE FOR FORMING LIQUID-DROPS OF MIXED LIQUID

TECHNICAL FIELD

The present invention relates to a droplet formation method of a mixed liquid and a droplet formation device of the same.

BACKGROUND ART

Conventionally, in a chemical reaction in a liquid phase taken as a reaction field, when development of a reaction for synthesizing a desired product from a plurality of source materials is performed and the reaction is analyzed, for example, it is necessary to perform workings to optimize reaction conditions by grasping concentration dependency of each source material, the concentration dependency of a catalyst (including an enzyme), an effect of a case where a different catalyst is used, an effect of a case where a different solvent is used or the like to the yield of the desired product in a promising reaction.

In this case, it may be necessary to analyze a huge number of samples with reaction conditions changed like a drug screening or the like, for example, in the development of pharmaceuticals. For that reason, studied has been the development of a technology that a number of a mixed liquid having each desired component composition which is used as a trace of droplet are quickly and regularly arranged on a predetermined spot on a substrate from a viewpoint that the working efficiency is improved and the cost is reduced.

More concretely, studied has been the development of the technology on the droplet formation method of the mixed liquid that the source liquids including the materials which are involved in the reactions of the source materials, a catalyst or the like are each prepared, and that when analysis is performed, these droplets are each mixed in a predetermined volume ratio in situ, and the droplets of the mixed liquid having different component compositions are instantaneously formed on the substrate.

For example, Japanese Laid-Open No. 2001-116750 A proposes that the method that by using a plurality of ink jet nozzles, supplying a predetermined quantity of active substances (nucleotide, cDNA, DNA fragment, enzyme, antigen, antibody, epitope, protein or the like) onto a predetermined spot on a substrate at a high speed and fixing the substance on the spot surface, an active chip that the substances (DNA fragment, cDNA, polypeptide, oligonucleotide or the like) used as a probe or the like for analyses or the like of DNA or the like are fixed on the substrate is manufactured, and that the method that the aforementioned active substance is manufactured on the predetermined spot on the substrate by using the reactant material in place of the aforementioned active substances with the same method.

DISCLOSURE OF THE INVENTION

However, in case of the aforementioned conventional droplet formation method of a mixed liquid, there was a problem that since the lesser the droplets of each raw material liquid to be used became, the less the fluidity inside the droplet became by the affect of the surface tension on the droplet, and that even though a plurality of droplets of raw material liquids were physically unified, it was difficult to obtain a droplet in a state where the components were uniformly distributed.

In addition, there was a problem that since the lesser the droplets of each raw material liquid became, before the mixing between the droplets of the raw material liquids fully progressed, the vaporization of the droplets of each raw material liquid in a state while the droplets dropped or after the droplets reached the substrate was more likely to progress in a short time, it was difficult to obtain a droplet under the condition that the components were uniformly distributed from this viewpoint.

If the droplet of a mixed liquid where the components are uniformly distributed can not be formed like this, it is difficult to precisely observe and analyze a chemical reaction which progresses in the droplets of the mixed liquid functioning each as the reaction fields. In addition, as the reproducibility of an analytical result deteriorates, the reliability is insufficient.

The present invention has been accomplished in view of the foregoing problems and is intended to provide the droplet formation method of a mixed liquid that even though the quantity is a trace, a number of droplets of the mixed liquid where the components are uniformly distributed can be quickly and regularly arranged at a predetermined position on a substrate and the droplet formation device of the mixed liquid.

The present invention provides the droplet formation method of the mixed liquid, wherein the raw material liquid is delivered from the tips of each capillary to form the droplet of the mixed liquid consisting of the raw material liquid on a substrate by applying a pulse voltage between the raw material liquid stored for each of a plurality of capillaries and the substrate disposed opposite to the tips of each capillary.

Here, the present invention uses the method that electrostatic attraction is utilized when the droplet is formed at a predetermined position on the substrate. This method is a method that a pulse voltage is applied between the liquid stored in the capillaries for forming droplets (hereinafter referred to as "raw material liquid") and the substrate disposed opposite to the capillary tips which are the droplet dripping outlets to attract the liquid from the capillary tips to the substrate side by electric force and drip the droplets onto the substrate.

As described above, the mixed liquids themselves can be mixed by allowing them to collide with each other in the space between each capillary and the substrate before each raw material pulled out by electric force from each capillary tip reaches the substrate by applying the pulse voltage between each raw material liquid stored in a plurality of capillaries and the substrate. Since the droplets of the mixed liquid formed by the collision of the raw material liquids themselves in the space between each capillary and the substrate are of a turbulent flow inside the droplets, the mixing of the raw material liquids themselves can be sufficiently accelerated for a short time. In addition, the mixing between the raw material liquids can be further definitely performed by allowing the droplets of the mixed liquid to collide the substrate by electric force.

In addition, in the droplet formation method according to the present invention, one droplet consisting of at least one kind of raw material liquid stored in at least one capillary out of a plurality of capillaries may be first formed on the substrate by delaying the timing of applying the pulse voltage. Even in this case, by applying the pulse voltage to the raw material liquids stored in the other capillaries just after the foregoing, the raw material liquids pulled out from the capillaries by electrostatic attraction are attracted by the existing droplets on the substrate and are rushed therein. Even if the droplets are later injected from the capillaries to collide against the existing droplets formed beforehand on the substrate like this, a turbulent flow occurs inside the droplets of the mixed liquid formed by the collision, the mixing between the raw material liquids can be sufficiently accelerated for a short time.

As a result, according to the present invention, although the quantity is a trace, a number of droplets of the mixed liquids where the components are uniformly distributed can be quickly and regularly arranged at the predetermined position on the substrate. Furthermore, the downsizing of working scale of a working which requires a treatment that various kinds of mixed liquids are prepared by mixing different liquids at an given rate and speed up of the working can be simultaneously materialized.

In addition, in the present invention, in order to form the droplets of the mixed liquids in the space between each capillary and the substrate by allowing each of the raw material liquids pulled out by electric force from a plurality of the capillary tips to collide with each other to mix them, the applying conditions of the pulse voltage or the disposition conditions of a plurality of capillaries to the substrate may be adjusted so as to concentrate the electric flux lines generated between each of raw material liquids and the substrate after the pulse voltage is applied on one droplet out of the droplets of the raw material liquids each delivered from each capillary tip.

Note that in the present invention, when the pulse voltage is applied between each raw material liquid and the substrate, the voltage may applied so as to allow each potential of the raw material liquids to be higher than that of the substrate, and the voltage may be applied so as to allow each potential of the raw material liquids to be lower than that of the substrate.

In addition, "the mixed liquid where the components are uniformly distributed" shows a liquid where the components are uniformly dissolved if the components to be used are dissolved in a liquid (a solvent) to be used and shows. On the other hand, the foregoing term shows a dispersion liquid where the components are uniformly dispersed if the components to be used are not dissolved in a liquid (dispersion medium). Furthermore, in the present invention, substances which mutually trigger a chemical reaction may be contained in a mixed liquid after being formed as components, a substance which is stably existent in the liquid may be mixed, and both substances may be contained in a mixed condition.

In addition, the droplet formation method of the mixed liquid according to the present invention may be characterized in that the value of the pulse voltage which is applied to the raw material liquid stored in at least one capillary out of a plurality of capillaries is made bigger than that of the pulse voltages which are applied to each of the other raw material liquids.

If the applying conditions of the pulse voltage which is applied between the raw material liquids stored by a plurality of capillaries and the substrate are set as described above, the electric flux lines generated between each raw material liquid and the substrate after the pulse voltage is applied can be concentrated on one droplet to which the maximum pulse voltage is applied out of the droplets of the raw material liquids each delivered from each capillary tip. As a result, all the droplets of the raw material liquids to be used can be consolidated to form the droplet of one mixed liquid in the space between each capillary and the substrate.

Furthermore, the droplet formation method of the mixed liquid according to the present invention may be characterized in that the application of the pulse voltage to the raw material liquid stored in at least one capillary out of a plurality of capillaries is first started, and next, the application of the pulse voltage to each of the other raw material liquids is started before the first application of the pulse voltage is finished.

If the applying conditions of the pulse voltage to be applied between the raw material liquid stored in each of a plurality of capillaries and the substrate are set as described above, the electric flux lines generated between each raw material liquid and the substrate after the pulse voltage is applied can be concentrated on one droplet with the earliest application start time of the pulse voltage out of the droplets of the raw material liquids each delivered from each capillary tip. As a result, all the droplets of the raw material liquids to be used can be consolidated to form the droplets of one mixed liquid in the space between each capillary and the substrate.

In addition, the droplet formation method of the mixed liquid according to the present invention may be characterized in that the distance between at least one capillary tip out of a plurality of capillary tips and the substrate is longer than the distances between each tip of the other capillaries and the substrate.

If the disposition conditions of a plurality of capillaries to the substrate are set as described above, the electric flux lines generated between each of the raw material liquids and the substrate after the pulse voltage is applied can be concentrated on one droplet delivered from a capillary with the longest distance from the substrate out of the droplets of the raw material liquids each delivered from each capillary tip. As a result, all the droplets of the raw material liquids to be used can be consolidated to form the droplet of one mixed liquid.

In addition, the droplet formation method of the mixed liquid according to the present invention may be characterized in that the pulse voltage is sequentially applied to each of the raw material liquids stored in a plurality of capillaries in all different timings. Namely, the formation method may be characterized in that after applying the pulse voltage to the raw material liquid stored in some one capillary is finished, the pulse voltage is applied to the raw material liquid stored in another capillary.

The electric flux lines generated between the raw material liquid and the substrate can be concentrated on the droplet previously formed by adjusting the pulse voltage applying conditions to each raw material stored in a plurality of capillaries as described above. As a result, each raw material liquid is sequentially and uniformly mixed by being collided with the existing droplets.

Furthermore, if the droplet formation method of the mixed liquid according to the present invention adopts the aforementioned pulse voltage applying conditions, the formation method may be characterized in that the volume or mass of droplets formed on the substrate is measured every time the application of each pulse voltage is finished. Namely, the formation method may be characterized in that the volume or mass of the droplets formed on the substrate is measured at that point in a state before the pulse voltage application to the next raw material liquid is started (in a state that a droplet formation process is temporarily suspended), after the pulse voltage application to the raw material liquids stored in some one capillary is finished.

The volume or mass of the droplets formed on the substrate at a time of halfway when the final droplet of the mixed liquid is formed can be accurately measured as a temporarily established value without the influence on the droplets of the raw material liquids which subsequently collide against the aforementioned droplets by setting the timing that the volume or mass of the droplets formed on the substrate is measured as described above. As a result, the information such as the volume and mass of the raw material liquids which are important in a chemical reaction analysis or the like can be measured seriatim.

In addition, the droplet formation method of the mixed liquid according to the present invention may be characterized in that if the timing of measuring the volume or mass of the droplet formed on the substrate at that point is set as described above, the volume or mass of the droplet formed on the substrate is measured every time a pulse voltage application is finished, the volume or mass of the raw material liquid injected from every capillary is independently measured every the process of each pulse voltage application based on the measured value of the volume or mass of the foregoing droplet. Namely, the formation method may be characterized in that the volume or mass of the raw material liquid injected from a predetermined capillary may be obtained to form droplet Pn from droplet Pn−1 by performing the difference operation between the volume or mass of the droplet ("droplet Pn") of the mixed liquid on the substrate measured when the droplet formation process is temporarily suspended as described above and the volume or mass of the droplet ("droplet Pn−1") of another mixed liquid measured when the process just before the droplet formation process is suspended.

As described above, the volume or mass of each raw material liquid injected from each capillary can be accurately measured in each process by measuring the volume or mass of the droplet on the substrate every time the droplet formation process of the mixed liquid is temporarily suspended Furthermore, the droplet formation method of the mixed liquid according to the present invention may be characterized in that in the case described above, the quantity of the droplet formed on the substrate may be adjusted by performing feedback control based on the measured value of the volume or mass of the droplet formed on the substrate for each process of the pulse voltage application process. Namely, the formation method may be characterized in that a feedback control may be performed on the quantity of the droplet of the mixed liquid formed on the substrate based on the information on the volume or mass of the droplet on the substrate at the time of completion of each process measured for each process of pulse voltage application, or based on the information on the volume or mass of the raw material liquid injected from each capillary for each process found by a difference operation according to the foregoing information.

The droplet formation process is finished at a time when the volume or mass of the droplet on the substrate reaches a desired value by performing the control as described above, or a control that the kind of a raw material liquid to be injected into the droplet is changed halfway in a process can be performed.

Furthermore, the present invention provides a droplet formation device of the mixed liquid, wherein the droplet formation device of the mixed liquid provides a raw material liquid delivery section having a plurality of capillaries where the raw material liquids for forming the droplets of the mixed liquids are each stored, a substrate which is disposed opposite to the tips of each capillary and on which the droplets of the mixed liquids formed of the raw material liquids each delivered from the tips of each capillary are placed, a voltage applying device where a pulse voltage is applied between each raw material liquid stored in each capillary and the substrate and a controller which controls the voltage applying device.

The applying conditions of the pulse voltage can be adjusted so as to allow the electric flux lines generated between each raw material liquid and the substrate after the pulse voltage is applied to be concentrated on one droplet out of the droplets of the raw material liquids each delivered from the tips of each capillary by controlling the voltage applying device by the controller.

As a result, all the droplets of the raw material liquid to be used can be consolidated to form the droplet of one mixed liquid in the space between each capillary and the substrate, a number of droplets of the mixed liquid where the components are uniformly distributed even though the quantity is a trace can be quickly and regularly arranged at a predetermined position on the substrate.

In addition, the droplet formation device of the mixed liquid according to the present information may be characterized in that the controller controls the voltage applying device so as to allow the value of the pulse voltage to be applied to the raw material liquid stored in at least one capillary out of a plurality of capillaries to be bigger than those of the pulse voltages to be applied to each of the other raw material liquid.

By thus controlling the voltage applying device by the controller and adjusting the applying conditions of the pulse voltage to be applied between the raw material liquids stored for each of a plurality of capillaries and the substrate as described above, the electric flux lines generated between each of the raw material liquids and the substrate after the pulse voltage is applied can be concentrated on one droplet to which the highest pulse voltage is applied out of the droplets of the raw material liquid each delivered from each capillary tip.

Furthermore, the droplet formation device of the mixed liquid according to the present invention may be characterized in that the controller controls the voltage applying device so as to allow the application of the pulse voltage to be first started to the raw material liquid stored in at least one capillary out of a plurality of capillaries followed by allowing the application of the pulse voltage to be started to each of the other raw material liquids before the first application of the pulse voltage is finished.

By thus controlling the voltage applying device by the controller and adjusting the applying conditions of the pulse voltage to be applied between the raw material liquids stored for each of a plurality of capillaries and the substrate as described above, the electric flux lines generated between each of the raw material liquids and the substrate after the pulse voltage is applied can be concentrated on one droplet with the earliest application start time when the pulse voltage is applied out of the droplets of the raw material liquids each delivered from each capillary tip.

In addition, the droplet formation device of the mixed liquid according to the present invention may be characterized in that the distance between the tip of at least one capillary out of a plurality of capillaries and the substrate is set to be longer than the distances between each tip of the other capillaries and the substrate.

If the disposition conditions of a plurality of capillaries to the substrate are thus adjusted, after the pulse voltage is applied, the electric flux lines generated between each of the raw material liquids and the substrate can be concentrated on one droplet delivered from a capillary with the longest distance to the substrate out of the droplets of the raw material liquids each delivered from each capillary tip.

Furthermore, the droplet formation device of the mixed liquid according to the present invention may be characterized in that the controller controls the voltage applying device so as to sequentially apply the pulse voltage to each of the raw material liquids stored in a plurality of capillaries in all different timings. Namely, the formation method may be characterized in that the controller controls the voltage applying device so as to apply the pulse voltage to the raw material liquid stored in another capillary after finishing the application of the pulse voltage to the raw material liquid stored in some one capillary.

By adjusting the applying conditions of the pulse voltage to each of the raw material liquids stored in a plurality of capillaries as described above, the electric flux lines generated between the raw material liquid and the substrate can be concentrated on the droplet previously formed. As a result, each of the raw material liquids is sequentially and uniformly mixed by being collided with the existing droplets.

In addition, the droplet formation device of the mixed liquid according to the present invention may be characterized in that a volume measuring device for measuring the volume of a droplet formed on a substrate and/or a mass sensor for measuring the mass of the droplet are further provided and the controller controls the volume measuring device and/or the mass sensor together with the voltage applying device.

This allows the droplet of a mixed liquid with a desired component composition to be quickly and definitely formed. For example, if the controller controls the voltage applying device so as to sequentially apply the pulse voltage to each of the raw material liquids stored in a plurality of capillaries in all different timings, the volume or mass of the droplet formed on the substrate can be measured every time the application of each pulse voltage is finished by allowing the controller to control the volume measuring device and/or the mass sensor.

As a result, the volume or mass of the droplet of the mixed liquids formed on the substrate at a time of halfway when the droplet of the final mixed liquid is formed can be accurately measured as a temporarily established value without any influence of the droplets of the raw material liquid which subsequently collide against the aforementioned droplet. As a result, the information such as the volume and mass of the raw material liquid important in chemical reaction analyses or the like can be sequentially measured.

In addition, the droplet formation device of the mixed liquid according to the present invention may be characterized in that the controller controls the voltage applying device and the volume and/or the mass sensor so that the controller measures the volume or mass of the droplet formed on the substrate at that point every time the application of the pulse voltage is finished and the volume or mass of the raw material liquid injected from each capillary can be independently measured for each process that each pulse voltage is applied based on the measured value of the volume or mass of the aforementioned droplet.

As described above, by temporarily suspending the droplet formation process of the mixed liquid and measuring the volume or mass of the droplet on the substrate for each suspension, the volume or mass of each of the raw material liquids injected from each capillary can be accurately measured in each process.

Furthermore, the droplet formation device of the mixed liquid according to the present invention may be characterized in that the quantity of the droplets of the raw material liquid formed on the substrate is adjusted by allowing the controller to perform feedback control on the voltage applying device based on the measured value of the volume or mass of the droplets formed on the substrate every process that each pulse voltage obtained from the volume measuring device and/or the mass sensor is applied.

By performing a control as described above, a control that the droplet formation process is finished at a time when the volume or mass of the droplet on the substrate reaches a desired value or the kind of a raw material liquid to be injected to a droplet is changed during a process can be materialized.

BRIEF DESCRIPTION OF THE DRAWINGS

FIGS. 10A to 10C are views each showing the formation process of the droplet of the mixed liquid formed between a raw material delivery section 20 and a substrate 30 if a pulse voltage shown in FIG. 9 is applied.

BEST MODES FOR CARRYING OUT THE INVENTION

Hereinafter described below will be the preferred embodiments of the droplet formation method of the mixed liquid and the droplet formation device of the mixed liquid according to the present invention with reference to the drawings. Note that in the description below, the same symbols will be denoted in the same or equivalent portions and the duplicated descriptions will be omitted.

FIRST EMBODIMENT

Figure 1:
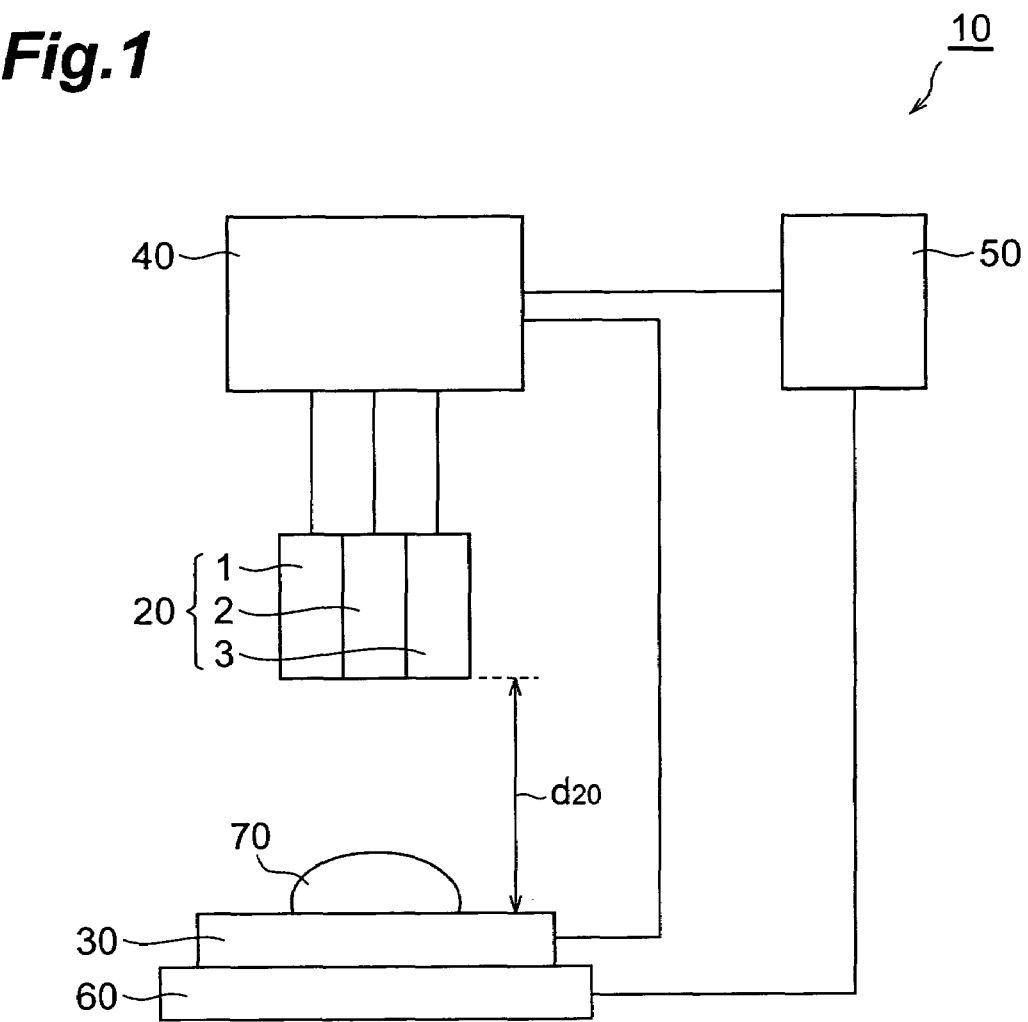
FIG. 1 is a system diagram schematically showing the basic constitution of a first embodiment of the droplet formation device of a mixed liquid according to the present invention.

FIG. 1 is a system diagram schematically showing the basic constitution of a fist embodiment of the droplet formation device of a mixed liquid according to the present invention. In addition, FIG. 2 is a front view of a capillary provided at a raw material liquid delivery section of the droplet formation device of the mixed liquid shown in FIG. 1 as viewed from the normal direction of a substrate surface.

As shown in FIG. 1, a droplet formation device 10 of the mixed liquid in the first embodiment is a device which is operated based on the droplet formation method of the mixed liquids according to the present invention and comprises the raw material liquid delivery section 20 having three capillaries 1, 2 and 3 where the raw material liquid for forming the droplet of the raw material liquid is each stored, a substrate 30 on which a droplet 70 of the mixed liquid formed of the raw material liquids each delivered from the tips of the three capillaries is loaded, a moving stage 60 on which the substrate is mounted, a voltage applying device 40 which applies a pulse voltage between each of the raw material liquids stored in each capillary 1, 2, and 3 and the substrate 30 and a controller 50 which controls the voltage applying device 40 and the moving stage 60.

The controller 50 is electrically connected with the voltage applying device 40 and the moving stage 60. The controller 50 can arbitrarily change a relative position between the raw material liquid delivery section 20 and the substrate 30 loaded on the moving stage 60 within a predetermined range. In addition, the voltage applying device 40 is electrically connected with the raw material liquid delivery section 20 and the substrate 30 and has a constitution where the pulse voltage can be independently applied to each of the raw material liquids stored every three capillaries in the raw material liquid delivery section 20.

Figure 2:
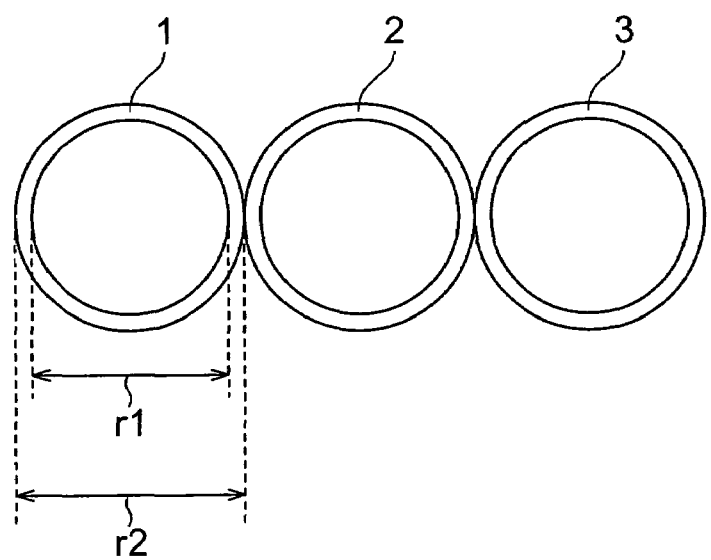
FIG. 2 is a front view of a capillary provided at a raw material liquid delivery section of the droplet formation device of the mixed liquid shown in FIG. 1 as viewed from the normal direction of a substrate surface.

Furthermore, as shown in FIG. 2, for the three capillaries 1, 2 and 3 comprising the raw material liquid delivery section 20, the cross section shape of the delivery outlet is almost circular and they are each a capillary tube, for example, with inner diameter of 5 to 50 μm. In addition, for the three capillaries 1, 2 and 3, the capillary 2 is disposed between the capillaries 1 and 3, and as shown in FIG. 2, the circular delivery outlets of the three capillaries 1, 2 and 3 are disposed so as to be linearly aligned as they are viewed from the normal direction of the surface of the substrate 30.

Furthermore, as shown in FIG. 1, the delivery outlets of each capillary 1, 2 and 3 are disposed so as to allow the delivery outlets of the capillaries 1 and 3 to contact with the delivery outlet of the capillary 2 with a focus on the delivery outlet of the capillary 2. In addition, the distances between each of the three capillaries 1, 2 and 3 and the substrate 30 are set so as to be the same distance d20.

These capillaries 1, 2 and 3 can be manufactured by preparing, for example, 3 glass-made tubes or 3 quartz-made tubes to extend with these capillaries in a bundle state. In this case, it is preferable that for each capillary 1, 2 and 3, the ratio r1/r2 of the inner diameter (see FIG. 2) to the outer diameter (see FIG. 2) of the delivery outlet is 0.5 to 0.9 from a viewpoint that the droplets of the raw material liquids delivered from the delivery outlets of each capillary 1, 2 and 3 are allowed to more definitely collide with each other and mix them in the space between the substrate 30 and the raw material delivery section 20.

In addition, the electrodes (unillustrated) which are electrically connected with the voltage applying device 40 are disposed so as to contact the raw material liquid inside each capillary 1, 2 and 3. And, the controller 50 controls the voltage applying device 40 so as to allow all the droplets of the raw material liquid to collide with each other to thereby form the droplet of one mixed liquid (see the droplet 74 in FIG. 4B later described) in the space between each capillary 1, 2 and 3 and the substrate 30 before the droplets (see the droplets 71, 72 and 73 in FIG. 4B later described) of the raw material liquids each delivered from the tips of each capillary 1, 2 and 3 reach the substrate 30.

Furthermore, as the substrate 30, for example, a rectangular plate made of metal such as silicon and aluminum or a rectangular plate made of plastics such as acryl resin and polyvinyl chloride can be used. In addition, if a rectangular metal plate is used as the substrate 30, an organic film, a reaction reagent or the like may be coated on the surface on which the droplet of the mixed liquid is formed. Furthermore, if a rectangular plastic plate is used as the substrate 30, the electrode (unillustrated) which is electrically connected with the voltage applying device 40 is disposed inside the plate.

The operating principle of the droplet formation device 10 of the mixed liquid will be first described by using FIG. 3.

Figure 3A:
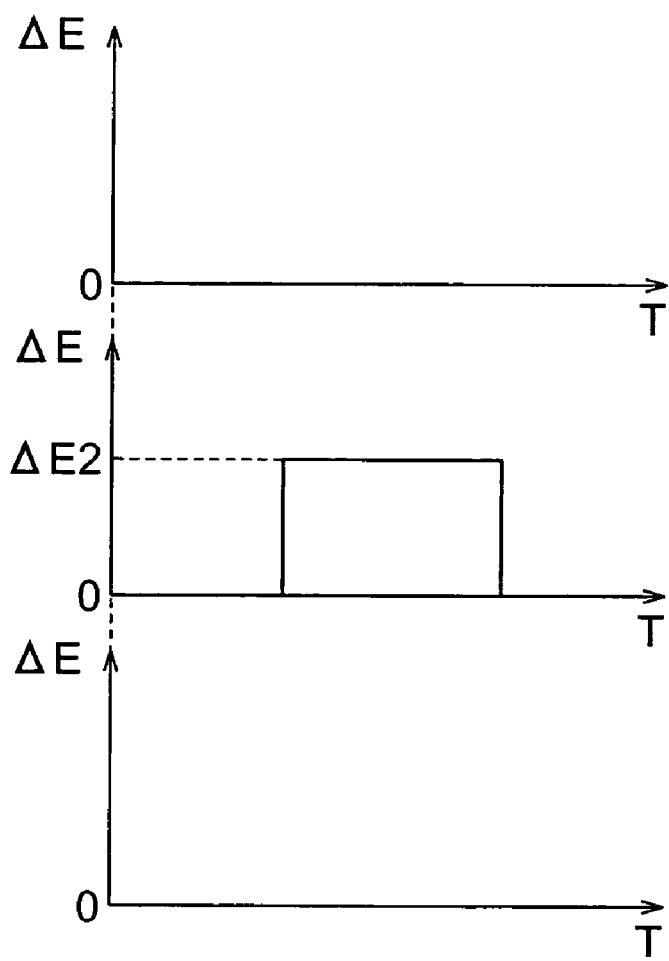
FIG. 3A is a graph showing one example of the patterns of a pulse voltage outputted from a voltage applying device controlled by a controller in the droplet formation device of the mixed liquid shown in FIG. 1.
Figure 3B:
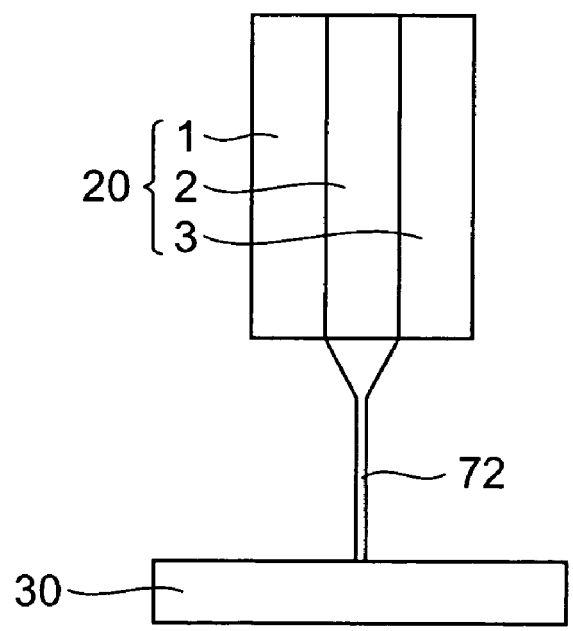
FIG. 3B is a view showing the formation process of the droplet formed between the raw material delivery section and the substrate if a pulse voltage shown in FIG. 3A is applied.

FIG. 3A is a graph showing one example of the patterns of a pulse voltage outputted from the voltage applying device 40 controlled by the controller 50 in the droplet formation device 10 of the mixed liquid shown in FIG. 1. FIG. 3B is a view showing the formation process of the droplet 72 formed between the raw material delivery section 20 and the substrate 30 if the pulse voltage shown in FIG. 3A is applied. Note that in FIG. 3A, the vertical axis shows the intensity of the pulse voltage of $\Delta E$ and the horizontal axis shows the time T.

In the first place, the raw material liquid in the capillary 2 is placed inside the capillary 2 against the gravity by the surface tension. However, as shown in FIG. 3A, if the pulse voltage of $\Delta E2$ is applied in a predetermined pulse width between the raw material liquid in the capillary 2 and the substrate 30, as shown in FIG. 3B, the droplet 72 of the raw material liquid is drawn from the tip of the capillary 2 by electric force, and the droplet is formed as a columnar droplet in the space between the capillary 2 and the substrate 30. Then, the droplet of a predetermined quantity is formed on the substrate 30 by allowing the droplet 72 of the raw material liquid to collide against the substrate 30 and depositing thereon.

In this case, since if the peak value or the pulse width of the pulse voltage to be applied from the voltage applying device 40 by the controller 50 is increased, the volume of the droplet formed on the substrate 30 is increased. In addition, if the peak value or the pulse width of the pulse voltage to be applied is decreased, the volume of the droplet formed on the substrate 30 is decreased, and the volume of the formed droplet can be controlled by controlling the peak value and/or the pulse width.

Namely, in the formation device 10 of the mixed liquid, the volumes of the droplets 71, 72 and 73 of the raw material liquids each delivered from the tips of a plurality of capillaries 1, 2 and 3 can be adjusted independently of each of the raw material liquids by changing the intensity and/or the pulse width of the pulse voltage to be applied between each capillary and the substrate 30, and the raw material liquid to be used can be precisely mixed in any ratio. Therefore, the composition ratio of the components in the droplet 70 of the obtained mixed liquid can be precisely controlled.

Note that the distance d20 between the raw material delivery section 20 and the substrate 30 is set considering the volume of the droplet 70 of the mixed liquid formed on the substrate 30 or the like. In addition, it is preferable that the pulse voltage is applied so as to allow the position of Pm at which all the droplets 71, 72 and 73 of the raw material liquids collide with each other to satisfy the following conditions from a viewpoint that all the droplets 71, 72 and 73 of the raw material liquids are consolidated to more definitely form the columnar droplet 74 of one mixed liquid. Namely, it is preferable that the pulse voltage is applied so as to allow the ratio of dm/d20 of the distance dm between the substrate 30 and the aforementioned position of Pm to the distance d20 between the raw material delivery section 20 and the substrate 30 to be 0.3 to 0.8 (see FIG. 4B and FIG. 5C).

Next, description below will be made of one example of the operation of the droplet formation device 10 of the mixed liquid with reference to FIG. 4 and one preferred embodiment of the trace droplet formation method of the mixed liquid according to the present invention.

Figure 4A:
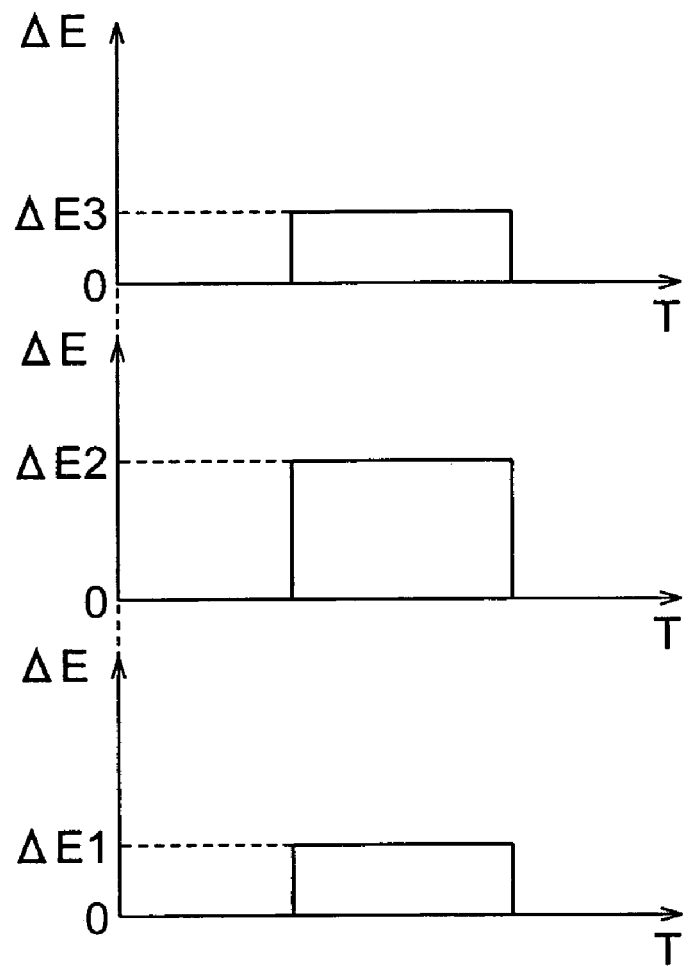
FIG. 4A is a graph showing one example of the patterns of the pulse voltage outputted from the voltage applying device controlled by the controller in the droplet formation device of the mixed liquid shown in FIG. 1.
Figure 4B:
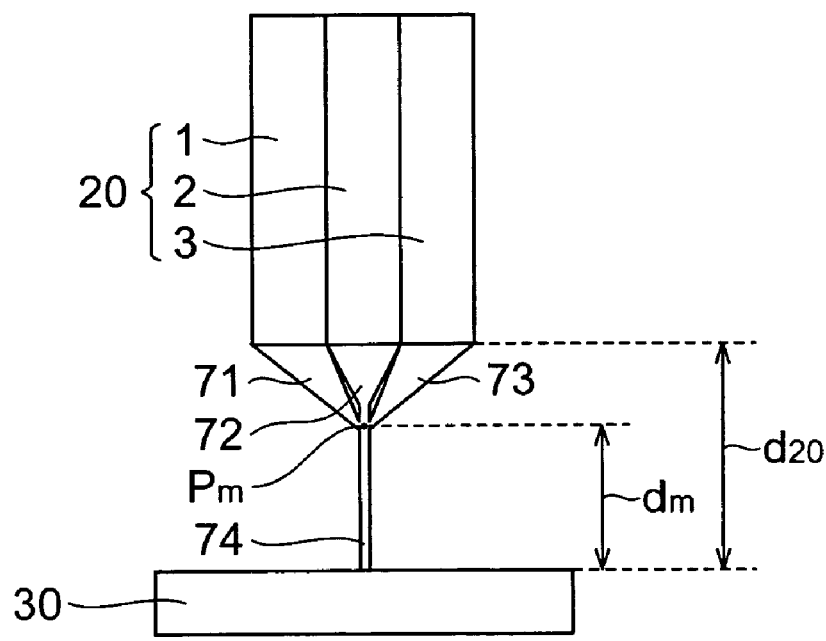
FIG. 4B is a view showing the formation process of the droplet of the mixed liquids formed between the raw material delivery section and the substrate if the pulse voltage shown in FIG. 4A is applied.

FIG. 4A is a graph showing one example of the patterns of the pulse voltage outputted from the voltage applying device 40 controlled by the controller 50 in the droplet formation device 10 of the mixed liquid shown in FIG. 1 and FIG. 4B is a view showing the formation process of the droplet 74 formed between the raw material delivery section 20 and the substrate 30 if the pulse voltage shown in FIG. 4A is applied. Note that in FIG. 4A, the vertical axis shows the intensity of the pulse voltage of $\Delta E$ and the horizontal axis shows the time T.

As shown in FIG. 4, when the pulse voltage is applied from the voltage applying device 40, the controller 50 controls the voltage applying device 40 so as to allow the value $\Delta E2$ of the pulse voltage to be applied between the raw material liquid stored in the capillary 2 out of the three capillaries 1, 2 and 3 and the substrate 30 to be bigger than the values $\Delta E1$ and $\Delta E3$ of the pulse voltages to be applied between each of the raw material liquids stored in the capillaries 1 and 3 and the substrate 30.

If the pulse voltage is applied between each of the raw material liquids stored in each capillary 1, 2 and 3 and the substrate 30 under the applying conditions of the pulse voltage as described above, as shown in FIG. 4B, after the pulse voltage is applied, the electric flux lines generated between each of the raw material liquids and the substrate 30 can be concentrated on the droplet 72 of the raw material liquid delivered from the capillary 2 to which the highest pulse voltage is applied out of the columnar droplets 71, 72 and 73 of the raw material liquids each delivered from the tips of each capillary 1, 2 and 3.

As a result, the droplets 71, 72 and 73 of the raw material liquids drawn from the tips of each capillary 1, 2 and 3 can all be consolidated with a focus on the center of the droplet 72 of the raw material liquid delivered from the capillary 2 to which the highest pulse voltage is applied by an electric force, and the columnar droplet 74 of one mixed liquid can be formed in the space between the raw material delivery section 20 and the substrate 30. Therefore, even though the quantity is a trace, the droplet 70 of the mixed liquid where the components are uniformly distributed can be quickly formed at a predetermined position on the substrate 30.

Note that the intensity of the values $\Delta E1$ and $\Delta E3$ of the pulse voltage may be smaller than the value $\Delta E2$ of the pulse voltage, may be the same values as shown in the aforementioned FIG. 4A or may be the different values. In this case, the values $\Delta E1$ and $\Delta E3$ of the pulse voltage may be determined considering the composition ratio of the components in the droplet 70 of the mixed liquid formed on the substrate 30 or the like.

And, if a number of the droplets 70 of the mixed liquids are continuously formed on the substrate 30, the composition of the droplet 70 of the mixed liquid to be formed can be arbitrarily changed as described above by controlling the voltage applying device 40 with the controller 50 to change the values $\Delta E1$ to $\Delta E3$ of the pulse voltage or by changing each pulse width or the like. In addition, the volume of the raw material liquid can be arbitrarily changed by controlling the voltage applying device 40 and the moving stage 60 with the controller 50 to change the distance d20 between the raw material liquid delivery section 20 and the substrate 30 or the like.

As a result, even though the quantity is a trace, a number of the droplets 70 of the mixed liquid where the components are uniformly distributed can be quickly and regularly arranged at a predetermined position on the substrate 30.

Here, in FIGS. 4A and 4B, although the case that the highest pulse voltage is applied between the raw material liquid stored in the capillary 2 disposed at the center of each capillary 1, 2 and 3 and the substrate 30 has been described, in the present invention, the combination of the raw material liquid and the substrate to which the highest pulse voltage is applied is not limited by the disposition location of a capillary where the raw material liquid is stored.

However, it is preferable that the capillary out of each capillary to which the highest pulse voltage is applied is a capillary disposed at a position on which the electric flux lines are easily concentrated (for example, the position which is the nearest to a geometrical center when considering the geometrical disposition condition of the delivery outlet in each capillary) as the disposition conditions of each capillary are viewed from the normal direction of the substrate surface (see FIG. 2 or FIG. 7), as shown in FIGS. 4A and 4B, from a viewpoint that the droplets 71, 72 and 73 of the raw material liquids are all consolidated to efficiently form the columnar droplet 74 of one mixed liquid in the space between the raw material liquid delivery section 20 and the substrate 30.

Therefore, if the raw material liquid which is the major component is provided, considering the composition ratio of the components of the droplet 70 of the mixed liquid to be formed on the substrate 30, it is preferable that a capillary containing the raw material liquid is disposed at the aforementioned position and the highest pulse voltage is applied between the raw material liquid which is the major component and the substrate 30.

In addition, in this case, the pulse width of the pulse voltage to be applied to each capillary 1, 2 and 3 may be changed according to the composition ratio of the components of the droplet 70 of the mixed liquid formed on the substrate 30 or the like and the pulse width may be each different value or may be all the same values.

Furthermore, the size of the diameter of the delivery outlet at the tips of each capillary 1, 2 and 3 is not particularly limited. For example, for the capillary of a raw material liquid where the raw material liquid containing the component which is the major component of the droplet of the mixed liquid is stored, the size of the delivery outlet may be bigger than that of the other capillaries.

Next, description below will be made of another example of the operation of the droplet formation device 10 of the mixed liquid with reference to FIG. 5 and another preferred embodiment of the trace droplet formation method according to the present invention.

Figure 5A:
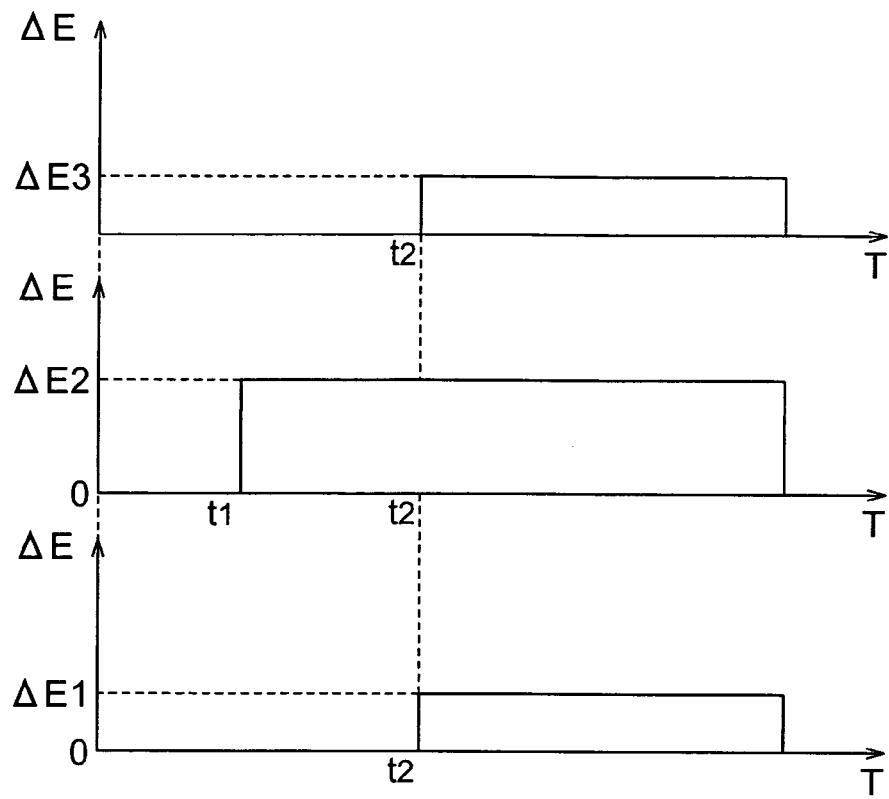
FIG. 5A is a graph showing one example of the patterns of the pulse voltage outputted from the voltage applying device controlled by the controller in the droplet formation device of the mixed liquid shown in FIG. 1.
Figure 5B:
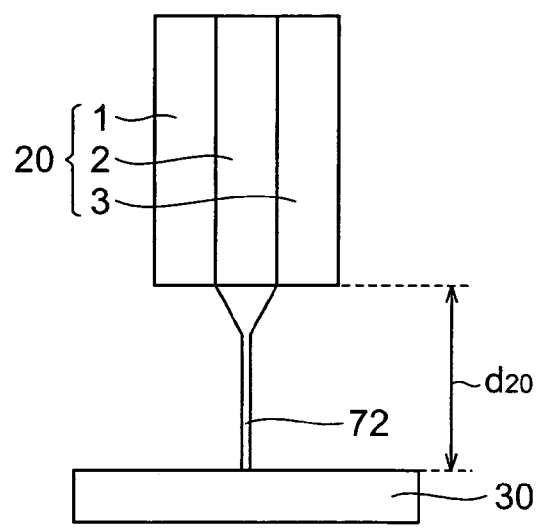
FIGS. 5B and 5C are views each showing the formation process of the droplet formed between the raw material delivery section and the substrate if the pulse voltage shown in FIG. 5A is applied.
Figure 5C:
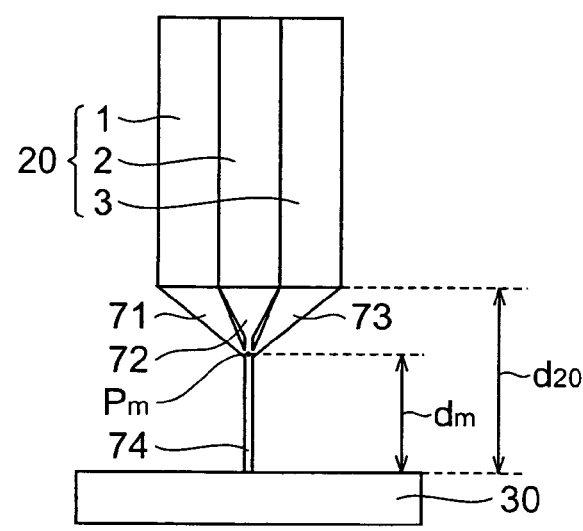

FIG. 5A is a graph showing one example of the patterns of the pulse voltage outputted from the voltage applying device 40 controlled by the controller 50 in the droplet formation device 10 of the mixed liquid shown in FIG. 1. FIGS. 5B and 5C are views each showing the formation process of the droplet 74 of the mixed liquid formed between the raw material delivery section 20 and the substrate 30 if the pulse voltage shown in FIG. 5A is applied. In addition, in FIG. 5, the vertical axis shows the intensity of the pulse voltage ΔE and the horizontal axis shows the time T.

As shown in FIG. 5A, when the pulse voltage is applied from the voltage applying device 40, the controller 50 controls the voltage applying device 40 so as to first start the application of the pulse voltage between the raw material liquid stored in the capillary 2 out of the three capillaries 1, 2 and 3 and the substrate 30 and then, so as to start the application of the pulse voltage between the raw materials stored in the other capillaries 1 and 3 and the substrate 30 before the first started application of the pulse voltage is finished.

Namely, when the pulse voltage is applied from the voltage applying device 40, the controller 50 controls the voltage applying device 40 so as to delay the application start time t2 of the pulse voltage to be applied between each of the other raw material liquids stored in the capillaries 1 and 3 and the substrate 30 against the application start time t1 of the pulse voltage to be applied between the raw material liquid stored in the capillary 2 out of the three capillaries 1, 2 and 3 and the substrate 30 at predetermined time intervals (t2 to t1).

If the pulse voltage is applied between each of the raw material liquids stored in each capillary 1, 2 and 3 and the substrate 30 under the applying conditions of the pulse voltage as described above, after the pulse voltage is applied, the electric flux lines generated between each of the raw material liquids and the substrate 30 can be concentrated on the droplet 72 of the raw material liquid delivered from the capillary 2 where the application start time of the pulse voltage is the earliest out of the droplets 71, 72 and 73 each delivered from the tips of each capillary 1, 2 and 3.

Namely, in the first place, as shown in FIG. 5B, the droplet 72 of the raw material liquid delivered from the capillary 2 where the application start time of the pulse voltage is the earliest reaches the substrate 30. Next, as shown in FIG. 5C, the columnar droplets 71 and 72 delivered from the capillaries 1 and 3 where the application start time of the pulse voltage is late are collided with the droplet 72 of the raw material liquid previously delivered to form the columnar droplet 74 of one mixed liquid.

As a result, the droplets 71, 72 and 73 of the raw material liquids drawn from the tips of each capillary 1, 2 and 3 can be all consolidated by electric force, with a focus on the droplet 72 of the raw material liquid previously delivered, and the columnar droplet 74 of one mixed liquid can be formed in the space between the raw material delivery section 20 and the substrate 30. Therefore, even though the quantity is a trace, the droplet 70 of the mixed liquid where the components are uniformly distributed can be quickly formed at a predetermined position on the substrate 30.

Note that in FIG. 5A, although described has been the case where the application start time of the pulse voltage to the capillaries 1 and 3 after the pulse voltage is applied to the capillary 2 is the same time, the application start time of the pulse voltage to the capillaries 1 and 3 may be different, the application start time may be determined considering the conditions of the composition ratio of the components of the mixed liquid to be formed or the like. Namely, in the present invention, the application start times of the pulse voltage to other capillaries to the capillary where the application start time of the pulse voltage is the earliest may be all the same time or different time.

In addition, the time interval (t2 to t1) of the application start time of the pulse voltage, that is, the timing of starting the application of the pulse voltage to the capillaries 1 and 3 after the pulse voltage is applied to the capillary 2 is determined considering the volume and the composition ratio of the components of the droplet 70 of the mixed liquid to be formed on the substrate 30, the distance d20 between the raw material delivery section 20 and the substrate 30, the size of the delivery outlet of the capillary 2 or the like.

However, it is preferable that in the present invention, the timing of starting the application of the pulse voltage to the capillary to which the pulse voltage is to be next applied to the capillary where the application start time is the earliest is determined so as to start the application of the pulse voltage to other capillaries at the same time as it is when the droplet of the raw material liquid delivered from the capillary where the application start time is the earliest reaches the substrate, as illustrated by the following examples, from a viewpoint that the droplets 71, 72 and 73 of the raw material liquids are all consolidated to efficiently form the columnar droplet 74 of one mixed liquid in the space between the raw material liquid delivery outlet 20 and the substrate 30.

Then, as shown in FIG. 1, if a number of the droplets 70 of the mixed liquid are continuously formed on the substrate 30, the application start time of the pulse voltage is changed by controlling the voltage applying device 40 with the controller 50 as described above, or the composition of the droplet 70 of the mixed liquid to be formed can be arbitrarily changed by changing each pulse width or the like.

In addition, the volume of the raw material liquid can be arbitrarily changed by changing the distance d20 between the raw material liquid delivery section 20 and the substrate 30 or the like by controlling the voltage applying device 40 and the moving stage 60 with the controller 50. As a result, even though the quantity is a trace, the a number of the droplets 70 of the mixed liquid where the components are uniformly distributed can be quickly and regularly arranged at a predetermined position on the substrate 30.

Note that in the present invention, if the application start time when the pulse voltage is applied to each capillary is set by delaying the application start time as illustrated by one example, the values of the pulse voltage to be applied for each capillary may be each different or all the same.

However, in this case, in the same manner as in the operation previously described by using FIG. 4, it is preferable that the voltage applying device 40 is controlled so as to allow the value ΔE2 of the pulse voltage to be applied between the raw material liquid stored in the capillary 2 out of the three capillaries 1, 2 and 3 and the substrate 30 to be bigger than the values ΔE1 and ΔE3 of the pulse voltage to be applied between each of the other raw material liquids stored in the capillaries 1 and 3 and the substrate, as shown in FIG. 5A, from a viewpoint that the droplets 71, 72 and 73 of the raw material liquids are all consolidated to efficiently form the columnar droplet 74 of one mixed liquid in the space between the raw material liquid outlet section 20 and the substrate 30.

In addition, in this case also, the pulse widths when the pulse voltage is applied to each capillary 1, 2 and 3 may be changed according to the composition ratio of the components of the mixed liquid to be formed on the substrate 30 or the like, may be each different or may be all the same.

Furthermore, in FIGS. 5A to 5C, although described has been the case where the pulse voltage is applied at the earliest application start time between the raw material liquid stored in the capillary 2 which is centrally disposed out of each capillary 1, 2 and 3 and the substrate 30, in this case also as described above, the combination of the raw material liquid and the substrate 30 to which the pulse voltage is applied at the earliest time is not limited by the disposition locations of each capillary 1, 2 and 3 where each of the raw material liquids is stored.

However, it is preferable that the capillary out of each capillary to which the pulse voltage is applied at the earliest time is a capillary which is disposed at a position where the electric flux lines are easily concentrated as the disposition conditions of each capillary are viewed from the normal direction of the substrate surface (see FIG. 2 or FIG. 7), as shown in FIGS. 5A to 5C, from a viewpoint that the droplets 71, 72 and 73 of the raw material liquids are all consolidated to efficiently form the columnar droplet 74 of one mixed liquid in the space between the raw material liquid delivery section 20 and the substrate 30.

SECOND EMBODIMENT

Next, description will be made of the second embodiment of the droplet formation device of the mixed liquid according to the present invention. The droplet formation device of the mixed liquid (unillustrated) according to the second embodiment replaces the raw material delivery section 20 in the droplet formation device of the mixed liquid according to the first embodiment shown in FIG. 1 with a different constitution thereof and the constitution other than the raw material liquid delivery section 20 is the same as that in the droplet formation device 10 of the mixed liquid according to the first embodiment.

Description below will be made of the raw material liquid delivery section 20 provided on the droplet formation device of the mixed liquid according to the second embodiment. As shown in FIG. 6B later described indicates, the distance d2 between the tip of the capillary 2 out of the three capillaries 1, 2 and 3 comprising the raw material liquid delivery section 20 and the substrate 30 is set to be bigger than the distance d1 between each tip of the other capillaries 1 and 3 and the substrate.

Next, description will be made of the operation of the droplet formation device of the mixed liquid according to the second embodiment with reference to FIG. 6 and another preferred embodiment of the trace droplet formation method according to the present invention.

Figure 6A:
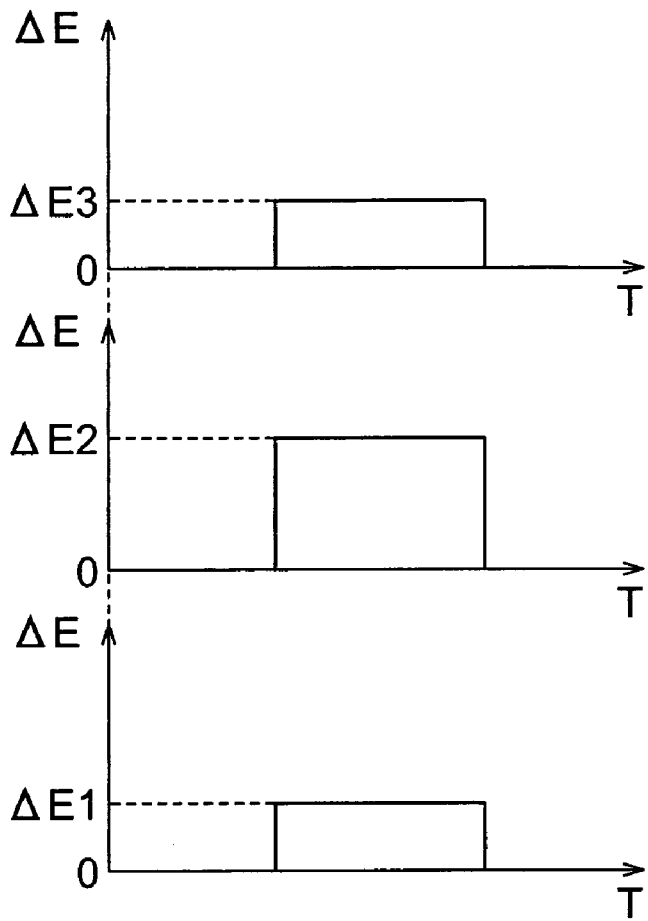
FIG. 6A is a graph showing one example of the patterns of a pulse voltage outputted from the voltage applying device controlled by the controller in a second embodiment in the droplet formation device of the mixed liquid according to the present invention.
Figure 6B:
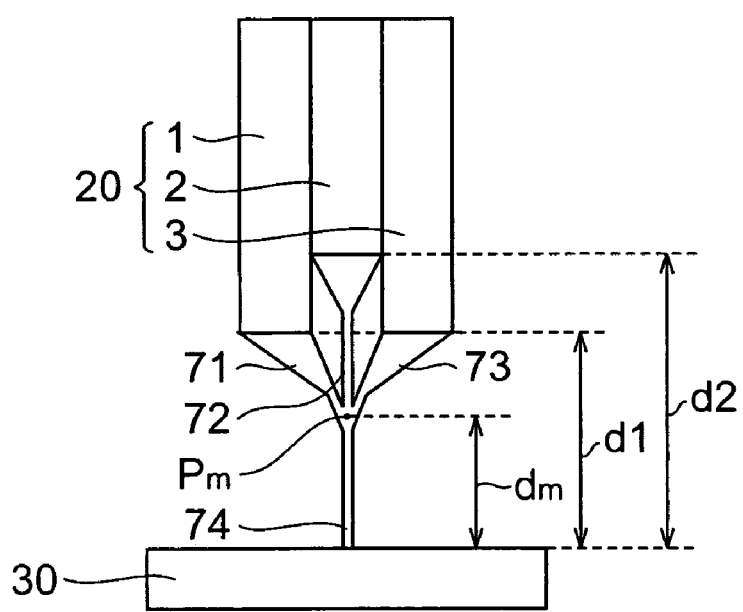
FIG. 6B is a view showing the formation process of the droplet formed between the raw material delivery section and the substrate if the pulse voltage shown in FIG. 6A is applied.

FIG. 6A is a graph showing one example of the patterns of the pulse voltage outputted from the voltage applying device 40 controlled by the controller 50 in the second embodiment in the droplet formation device of the mixed liquid according to the present invention. FIG. 6B is a view showing the formation process of the droplet 74 formed between the raw material delivery section 20 and the substrate 30 if the pulse voltage shown in FIG. 6A is applied. Note that in FIG. 6A, the vertical axis shows the intensity $\Delta E$ of the pulse voltage and the horizontal axis shows time T.

In the first place, the pulse voltage is applied between each of the raw material liquids stored in each capillary 1, 2 and 3 and the substrate 30 from the voltage applying device 40 by the controller 50. In this case, as each capillary 1, 2 and 3 comprising the raw material liquid delivery section 20 is disposed based on the aforementioned disposition conditions, the electric flux lines generated between each of the raw material liquids and the substrate 30 can be concentrated on the droplet 72 of the raw material liquid where the distance with the substrate 30 is the biggest out of the droplets 71, 72 and 73 of the raw material liquids each delivered from the tips of each capillary 1, 2 and 3.

As a result, the droplets 71, 72 and 73 of the raw material liquids drawn from the tips of each capillary 1, 2 and 3 can be all consolidated by electric force, with a focus on the droplet 72 of the raw material liquid delivered from the capillary 2 where the distance with the substrate 30 is the biggest, and the columnar droplet 74 of one mixed liquid can be formed in the space between the raw material liquid delivery section 20 and the substrate 30. Therefore, even though the quantity is a trace, a number of the droplets 70 of the mixed liquids where the components are uniformly distributed can be quickly arranged at a predetermined position on the substrate 30.

Note that the distance between each of the capillaries 1 and 3 and the substrate 30 may be shorter than the distance d2 between the capillary 2 and the substrate 30, may be the same value d1 as shown in FIG. 6 described above or different values. And, the ratio of the distance between the tip of the capillary 2 which is located at the most distant position from the substrate 30 and the substrate 30 (for example, d2 in FIG. 6B) to the distance between the tip of another capillary and the substrate 30 (for example, d1 in FIG. 6B) may be determined considering, for example, the volume and the composition ratio of the components of the droplet 70 of the mixed liquid, the distance d20 between the raw material liquid delivery section 20 and the substrate 30, the size of the delivery outlet of the capillary 2 or the like.

However, it is preferable that the pulse voltage is applied so as to allow the position Pm where all of the droplets 71, 72 and 73 of the raw material liquids collide with each other to satisfy the following conditions from a viewpoint that the droplets 71, 72 and 73 of the raw material liquids are all consolidated to more definitely form the columnar droplet 74 of one mixed liquid in the space between raw material liquid delivery section 20 and the substrate 30. Namely, it is preferable that the pulse voltage is applied so as to allow the ratio dm/d1 of the distance dm between the substrate 30 and the aforementioned position Pm to the distance d1 between the delivery outlet of a capillary out of the capillaries of the raw material liquid delivery section 20 disposed at a position which is the nearest to the substrate 30 and the substrate 30 to be 0.3 to 0.8 (see FIG. 6B).

In addition, the intensity of the values $\Delta E1$, $\Delta E2$ and $\Delta E3$ of the pulse voltage to be applied for each capillary 1, 2 and 3 is not particularly limited, for example, and may be all the same values. However, in this case also, it is preferable that the controller 50 controls the voltage applying device 40 so as to allow the value $\Delta E2$ of the pulse voltage to be applied between the raw material liquid stored in the capillary 2 where the distance with the substrate 30 is the biggest and the substrate 30 to be bigger than the values $\Delta E1$ and $\Delta E3$ of the pulse voltage to be applied between each of the other raw material liquids stored in the capillaries 1 and 3 and the substrate 30, for example, as shown in FIG. 6B, from a viewpoint that the droplets 71, 72 and 73 of the raw material liquids are all consolidated to efficiently form the columnar droplet 74 of one mixed liquid in the space between the raw material liquid delivery section 20 and the substrate 30.

Furthermore, in this case, for the application start time, when the pulse voltage is applied to each capillary 1, 2 and 3 at the same as illustrated by one example in FIG. 6A. However, in this case also, the controller 50 may control the voltage applying device 40 so as to allow the application start time when the pulse voltage is applied between the raw material liquid stored in the capillary 2 where the distance with the substrate 30 is the longest and the substrate 30 to be earlier than the application start time when the pulse voltage is applied between each of the raw material liquids stored in the other capillaries 1 and 3 and the substrate 30, as previously described by using FIG. 5A, from a viewpoint that the droplets 71, 72 and 73 of the raw material liquids are all consolidated to efficiently form the columnar droplet 74 of one mixed liquid in the space between the raw material liquid delivery section 20 and the substrate 30.

And, if a number of the droplets of the mixed liquid are continuously formed on the substrate 30, the composition of the droplet 70 of the mixed liquid to be formed can be arbitrarily changed by controlling the voltage applying device 40 with the controller 50 to change the ratio of the distance between each of the aforementioned capillaries 1, 2 and 3 and the substrate 30 described above, to change $\Delta E1$ to $\Delta E3$ of the pulse voltage, to change the application start time of the pulse voltage, to change each pulse width or the like.

In addition, the volume of the raw material liquid can be arbitrarily changed by controlling the voltage applying device 40 with the controller 50 to change the distance between each capillary 1, 2 and 3 and the substrate 30 or the like. As a result, even though the quantity is a trace, a number of the droplets 70 of the mixed liquid where the components are uniformly distributed can be quickly and regularly arranged at a predetermined position on the substrate 30.

Furthermore, in FIGS. 6A and 6B, although described has been the case where the distance between the tip of the capillary 2 which is centrally disposed out of each capillary 1, 2 and 3 and the substrate 30 is maximized, in this case also as described above, the combination of the capillary and the substrate 30 which maximizes the distance between the substrate 30 and the tip of a capillary is not limited by the disposition positions of each capillary 1, 2 and 3.

However, in this case also, it is preferable that what maximizes the distance between the tip and the substrate 30 is a capillary disposed at a position where the electric flux lines are easily concentrated as the disposition conditions of each capillary are viewed from the normal direction of the substrate surface (see FIG. 2 or FIG. 7), as shown in FIGS. 6A and 6B, from a viewpoint that the droplets 71, 72 and 73 of the raw material liquid are all consolidated to efficiently form the columnar droplet 74 of one mixed liquid in the space between the raw material liquid delivery section 20 and the substrate 30.

In addition, in this case also, the pulse width of the pulse voltage when the pulse voltage is applied to each capillary 1, 2 and 3 may be changed according to the composition ratio of the components of the droplet 70 of the mixed liquid formed on the substrate 30 or the like, the values may be each different or all the same values.

THIRD EMBODIMENT

Figure 8:
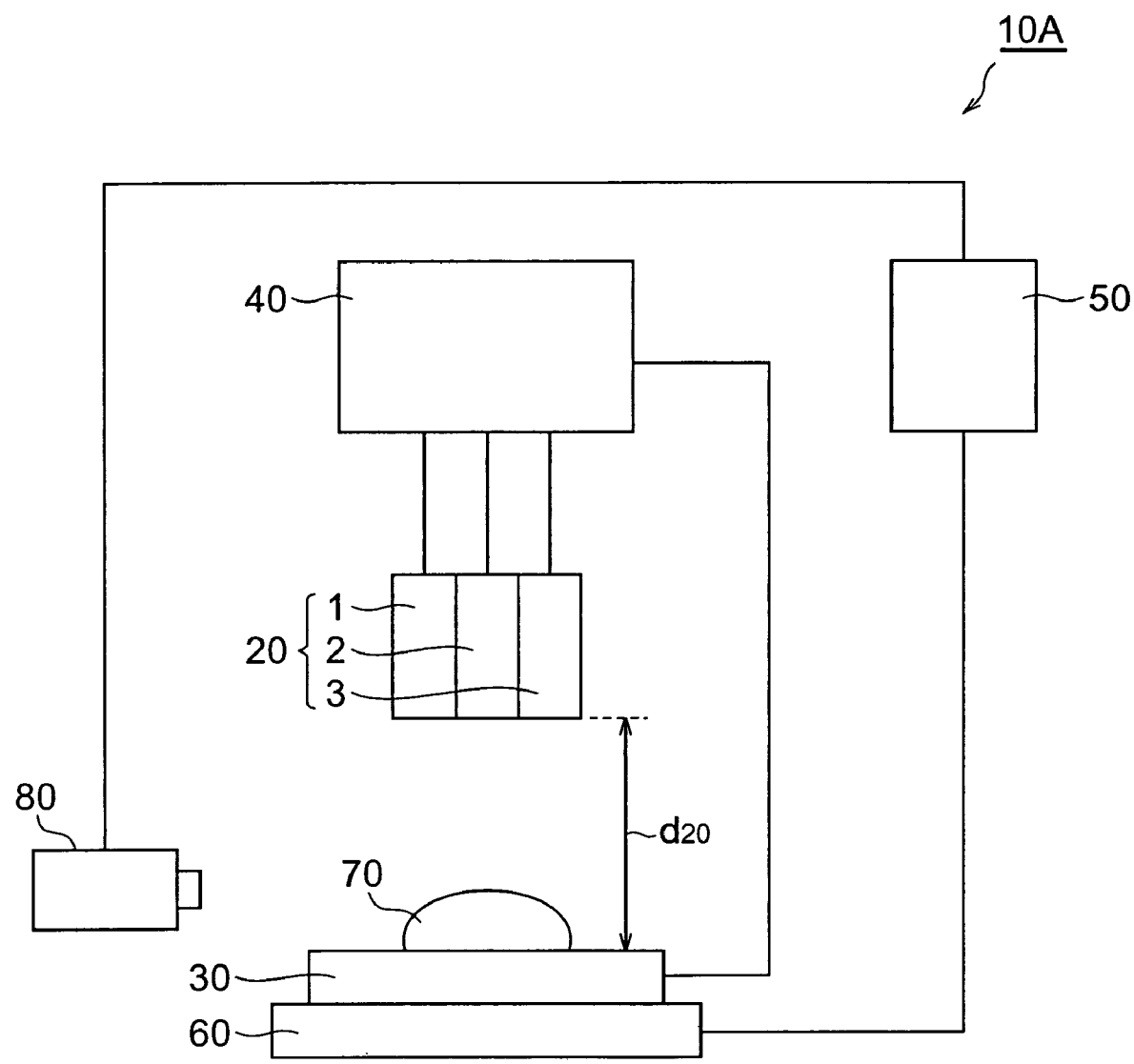
FIG. 8 is a system diagram schematically showing the basic constitution of a third embodiment of the droplet formation device of the mixed liquid according to the present invention.

Next, description will be made of the third embodiment of the droplet formation device of the mixed liquid according to the present invention. FIG. 8 is a system diagram schematically showing the basic constitution of the third embodiment of the droplet formation device of the mixed liquid according to the present invention. The droplet formation device 10A of the mixed liquid according to the third embodiment shown in FIG. 8 has the same as that in the droplet formation device 10 of the mixed liquid according to the first embodiment shown in FIG. 1 other than the volume measuring device 80 further provided to measure the volume of the droplet 70 (including the drops during forming) formed on the substrate 30.

In the first place, description will be made of the volume measuring device 80 with reference to FIG. 8. The volume measuring device 80 is electrically connected with the controller 50 and the volume measuring device 80 transmits an information on the volume of the droplet 70 (including the droplets during forming) formed on the substrate 30 as an electric signal to the controller 50.

The volume measuring device 80 observes the droplet 70 (including the droplets during forming) formed on the substrate 30 from the vertical direction to the normal of the substrate 30 and has an optical function for obtaining the side image and a function for calculating the volume of the droplet 70 from the side image data. The volume of the droplet 70 can be calculated as if the droplet 70 were regarded as a body of revolution relative to the normal direction of the substrate 30.

Namely, a relatively small voluminal droplet 70 has a property which keeps its profile shape to be highly symmetrical shape of a body of revolution by its surface tension. Therefore, the side image of the droplet 70 is obtained, the profile shape of the droplet 70 is approximated to a body of revolution based on the image data, and thereby the volume can be measured. And, the volume measuring device 80 measures the volume of the droplet 70 with the controller 50 in a proper timing.

Next, description below will be made of the operation of the droplet formation device of the mixed liquid according to the third embodiment with reference to FIGS. 9, 10 and 11 and one preferred embodiment of the trace droplet formation method according to the present invention.

Figure 9:
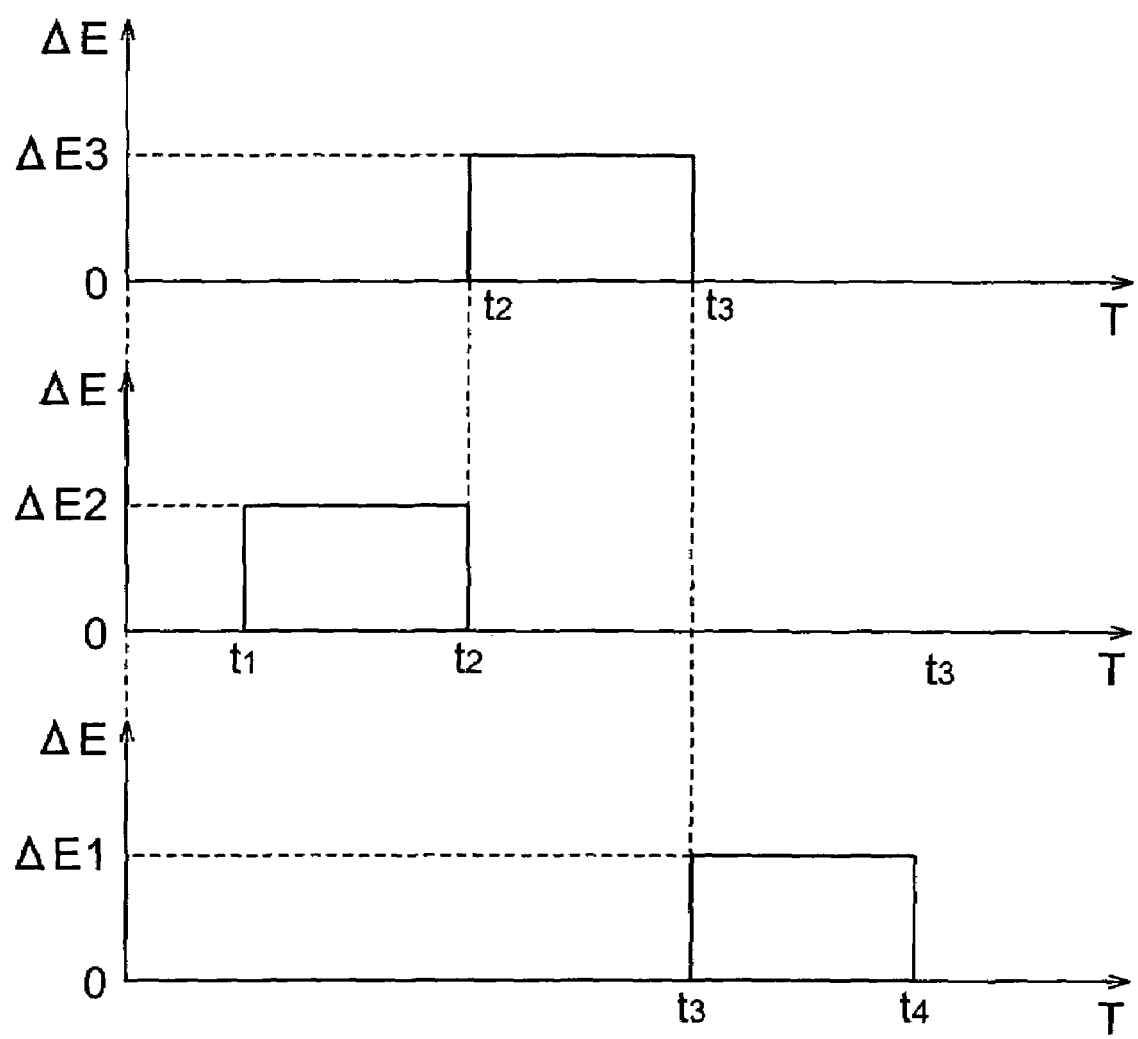
FIG. 9 is a graph showing one example of the patterns of the pulse voltage outputted from the voltage applying device controlled by the controller in the third embodiment of the droplet formation device of the mixed liquid according to the present invention.

FIG. 9 is a graph showing one example of the patterns of the pulse voltage outputted from the voltage applying device 40 controlled by the controller 50 in the third embodiment of the droplet formation device of the mixed liquid according to the present invention, and FIGS. 10A to 10C and FIGS. 11A to 11C are views showing the formation processes of the droplets 75 to 77 of the mixed liquids formed in the space between the raw material delivery section 20 and the substrate 30 if the pulse voltage shown in FIG. 9 is applied. Note that in FIG. 9, the vertical axis shows the intensity $\Delta E$ of the pulse voltage and the horizontal axis shows the time T.

As shown in FIG. 9, for the pulse voltage, $\Delta E2$ is first applied to the capillary 2 of the raw material delivery section 20, $\Delta E3$ is subsequently applied to the capillary 3 and $\Delta E1$ is finally applied to the capillary 1 in this order. The droplet formation processes as described progress by adopting the voltage applying patterns like this.

In the first place, as shown in FIG. 10A, if $\Delta E2$ is applied to the capillary 2, at a time of $t1 \leq T < t2$, a droplet formation process progresses just under the capillary 2. And, as shown in FIG. 10B, the droplet 75 consisting of the raw material liquid 72 injected from the capillary 2 is formed on the substrate 30 at a time of T=t2. The volume measuring device 80 obtains the image of the droplet 75 at the moment to measure the value V1-2 of the droplet volume. As the droplet 75 is a first droplet formed on the substrate 30, the raw material liquid volume $\Delta V2$ is $\Delta V2=V1-2$.

Subsequently, as shown in FIG. 10C, the pulse voltage $\Delta E3$ is applied to the capillary 3 at a time of $t2 \leq T < t3$. In this case, the electric flux lines between the raw material liquid 73 stored in the capillary 3 and the substrate 30 is concentrated on the droplet 75 which is already existent as a protrusion on the flat substrate 30. The raw material liquid 73 is drawn by electrostatic attraction to collide with the droplet 75, and a sufficient mixing progresses by causing a turbulent flow inside the droplet 75.

Figure 11A:
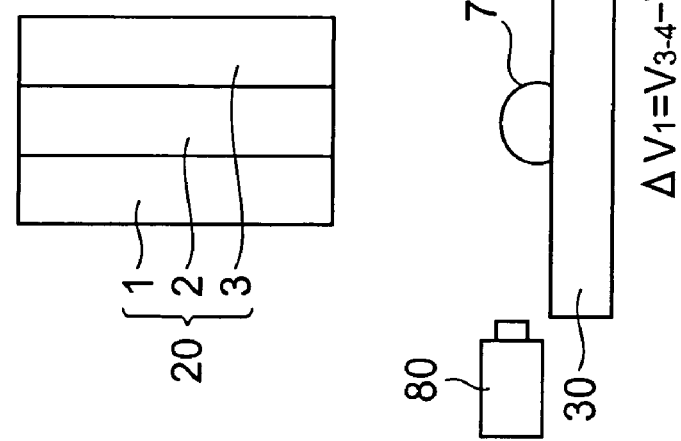
FIGS. 11A to 11C are views each showing the formation process of the droplet of the mixed liquid formed between the raw material delivery section 20 and the substrate 30 if a pulse voltage shown in FIG. 9 is applied.

And, as shown in FIG. 11A, the droplet 76 where the two kinds of the raw material liquids are sufficiently mixed is formed on the substrate 30 at a time of T=t3. At this moment, the image of the droplet 76 is obtained by the droplet volume measuring device 80, and the value V2-3 of the droplet volume is measured. As the droplet 76 is a droplet where the two kinds of the raw material liquids are mixed, the volume $\Delta V3$ of the raw material liquids injected from the capillary 3 is $\Delta V3 = V2\text{-}3 - V1\text{-}2$.

Figure 11B:
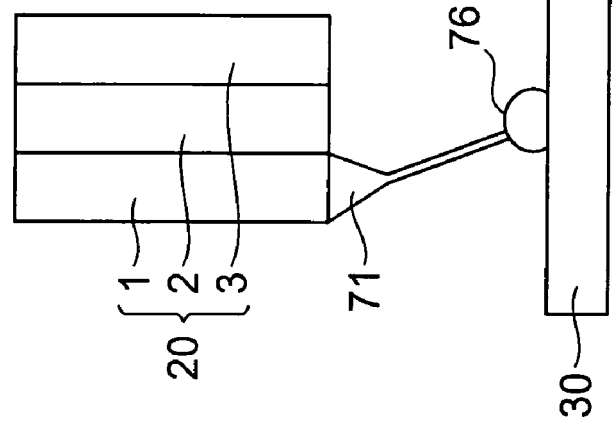

Subsequently, as shown in FIG. 11B, the pulse voltage $\Delta E1$ is applied to the capillary 1 at a time of $t3 \leq T < t4$. In this case, the electric flux lines between the raw material liquid 71 stored in the capillary 1 and the substrate 30 is concentrated on the droplet 76 which is already existent as a protrusion on the flat substrate 30. As the raw material liquid 71 is drawn by electrostatic attraction to collide against the droplet 76, a sufficient mixing progresses by producing a turbulent flow inside the droplet 76.

Figure 11C:
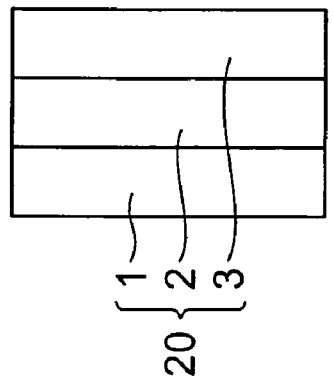

And, as shown in FIG. 11C, the droplet 77 where three kinds of the raw material liquids are sufficiently mixed is formed on the substrate 30 at a time of T=t4. It is found that the volume $\Delta V1$ of the raw material liquid injected from the capillary 1 is $\Delta V1 = V3\text{-}4 - V2\text{-}3$ by measuring the volume value V3-4 of the droplet 77 by the droplet volume measuring device 80.

The droplet formation process is finished at a time when the volume or mass of the droplet on the substrate 30 reaches a desired value by transmitting the information on the liquid droplet volumes of the mixed liquids V1-2, V2-3, V3-4, or the volumes $\Delta V1$, $\Delta V2$, $\Delta V3$ of each raw material liquid obtained as described above to the controller 50, or a feed back control that the kind of a raw material liquid injected to the droplet on the substrate 30 is changed during a process is enabled.

In this case, the pulse voltage values ($\Delta E1$, $\Delta E2$, $\Delta E3$), the distance between the raw material liquid delivery section 20 and the substrate 30 and the disposition positions of the capillaries in the raw material delivery section 20 are adjusted beforehand from a viewpoint that each raw material liquid drawn from the openings of the tips of each capillary 1, 2 and 3 is properly collided with the existing droplet (the droplet 75 or the droplet 76) on the substrate 30.

Here, it is desirable that the first droplet is formed just under the capillary 2 in the raw material liquid delivery section 20, because there is an effect that the adjustments are facilitated as described above by making the position relation between the opening of the tip of each capillary in the raw material liquid delivery section 20 and the droplet on the substrate 30 as symmetrically and equally distant as possible. However, if the adjustments can be made as described above, particularly, the first droplet may not be formed just under the capillary 2.

FOURTH EMBODIMENT

Figure 12:
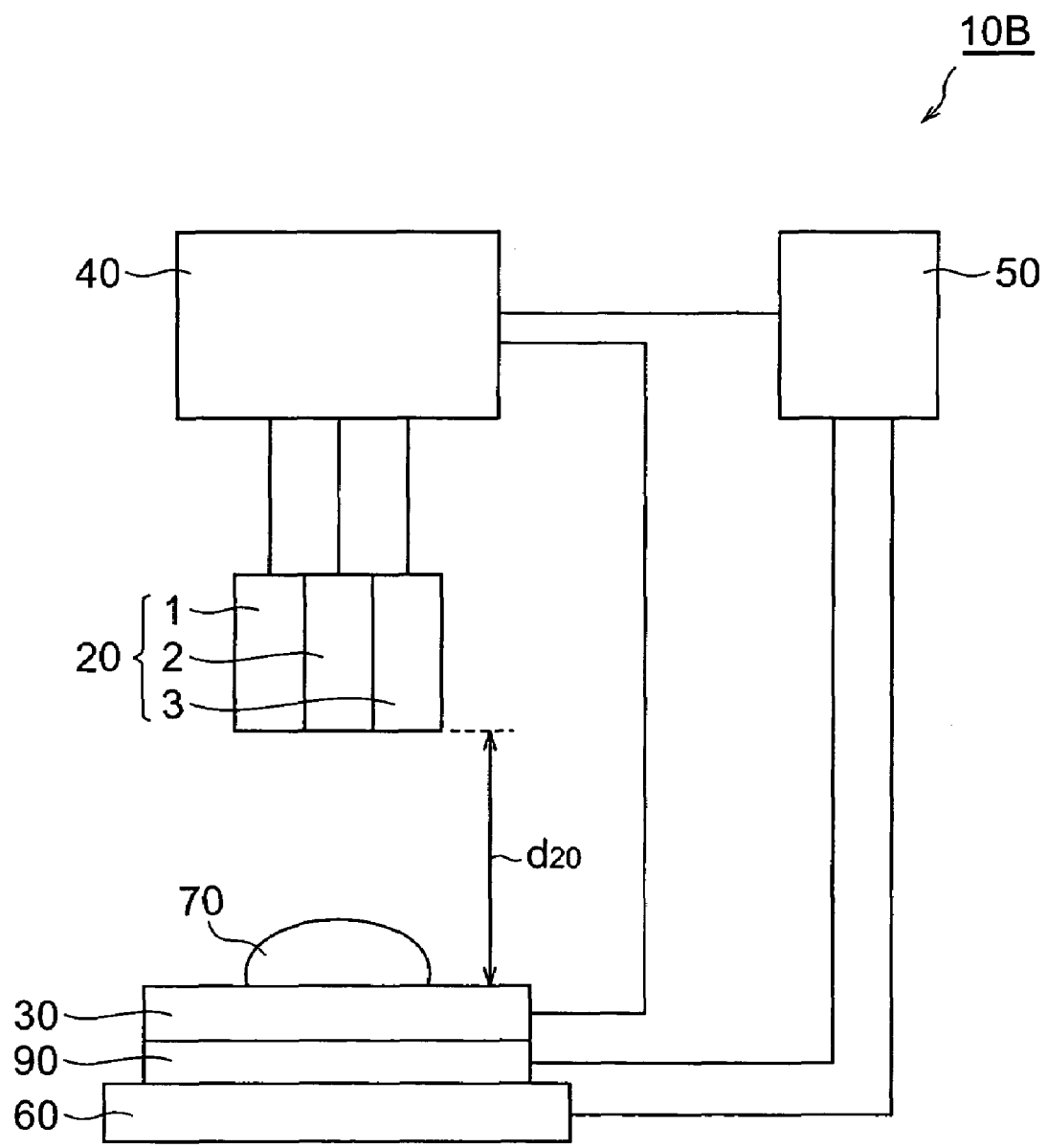
FIG. 12 is a system diagram schematically showing the basic constitution of a fourth embodiment of the droplet formation device of the mixed liquid according to the present invention.

Next, description will be made of the fourth embodiment of the droplet formation device of the mixed liquid according to the present invention. FIG. 12 is a system diagram schematically showing the basic constitution of the fourth embodiment of the droplet formation device of the mixed liquid according to the present invention.

In the droplet formation device 10B of the mixed liquid according to the fourth embodiment shown in FIG. 12, the mass sensor 90 is disposed between the substrate 30 and the moving stage 60 in place of the droplet volume measuring device 80 in the droplet formation device 10A of the mixed liquid according to the third embodiment shown in FIG. 8 and the constitution other than the foregoing is the same as in the droplet formation device 10A of the mixed liquid according to the third embodiment.

Next, description will be made of the mass sensor 90 with reference to FIG. 12. The mass sensor 90 is disposed between the substrate 30 and the moving stage 60 and measures the liquid droplet mass of the droplet 70 (including the droplets during forming). The mass sensor 90 measures the mass of the droplet 70 formed on the substrate 30 in a proper timing by the controller 50.

The operation of the droplet formation device 10B are omitted since the operation other than the below-mentioned points are the same as that in the droplet formation device 10A according to the third embodiment. Namely, the droplet formation device 10B forms the droplet 70 in the same operation as that in the droplet formation device 10A according to the third embodiment other than what the controller 50 controls the mass sensor 90 in place of the volume measuring device 80 and what the data (the measured physical quantities) obtained in each process is the mass of the droplet 70 during forming since the droplet 70 of the desired component composition and quantity (volume or mass) is formed.

Although the embodiments according to the present invention have been described in detail, the present invention is not limited to the aforementioned embodiments.

For example, although, in the droplet formation device of the mixed liquid according to the aforementioned embodiment, described has been the case where the three capillaries are disposed so as to allow the almost circular delivery outlets of the three capillaries 1, 2 and 3 to be linearly aligned as the three capillaries 1, 2 and 3 are viewed from the normal direction of the surface of the substrate 30, in the present invention, the way of disposing a plurality of capillaries is not particularly limited. For example, if the three capillaries are used like the aforementioned embodiment, the three capillaries may be disposed so as to allow the lines combining the geometrical centers of each delivery outlet of the three capillaries to form a triangle as the delivery outlets of the three capillaries are viewed from the normal direction of the surface of the substrate.

Although, in the droplet formation device of the mixed liquid according to each embodiment described above, described has been the case where the sectional shapes of the delivery outlets of each capillary are almost circular, in the present invention, the sectional shapes of the delivery outlets of a plurality of capillaries are not particularly limited. For example, they may be each an almost triangle or an almost rectangle.

Figure 7:
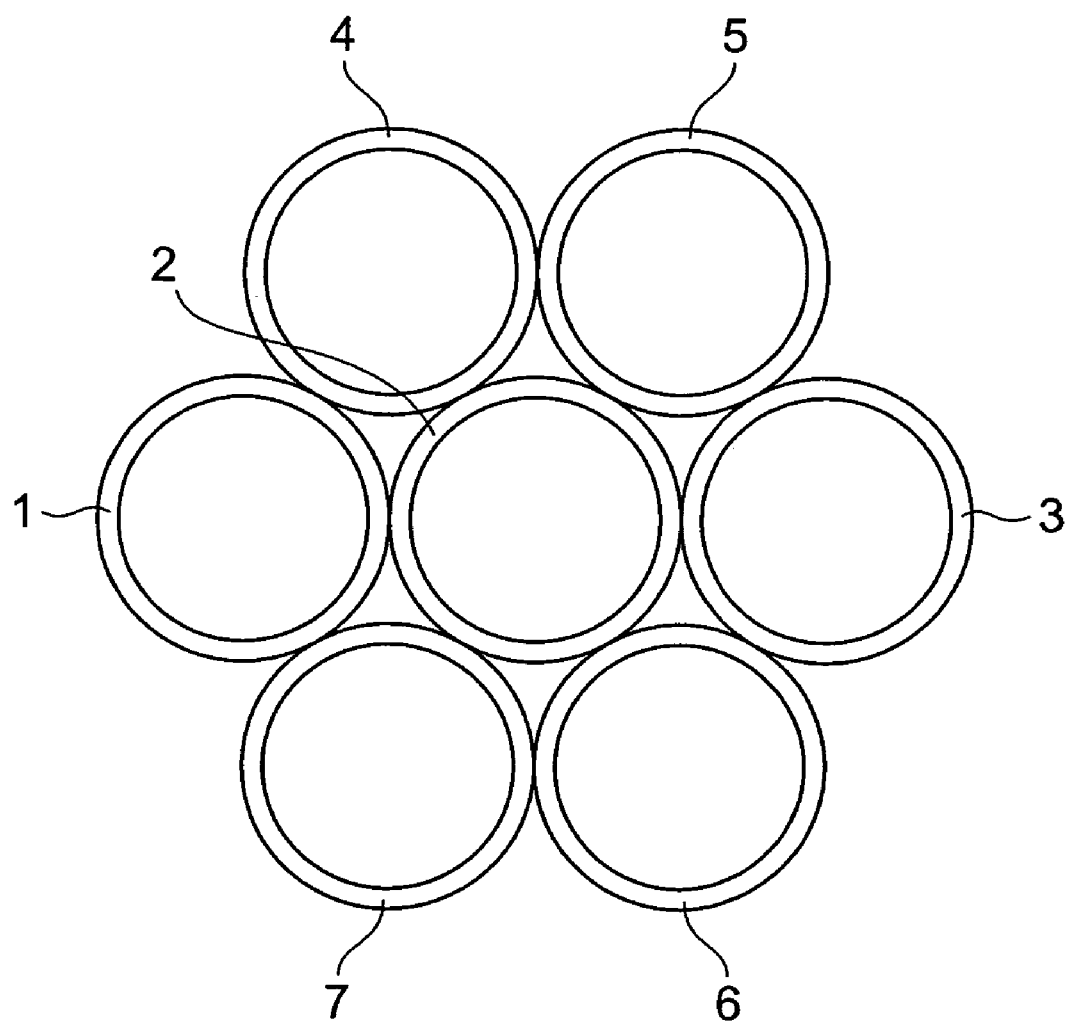
FIG. 7 is a front view showing another embodiments of the raw material delivery section in the droplet formation device of the mixed liquid shown in FIG. 1.

Furthermore, for example, although, in the droplet formation device of the mixed liquid according to each embodiment described above, described has been the case where the number of capillaries comprising the raw material liquid delivery sections is three capillaries, in the droplet formation device of the mixed liquid according to the present invention, the number of the capillaries comprising the raw material liquid delivery sections is not particularly limited, the number of the capillaries comprising the raw material liquid delivery sections may be arbitrarily set according to the conditions such as the composition of the components of the droplet of the mixed liquid to be formed and the volume of the droplet. For example, as shown in FIG. 7, the seven capillaries 1 to 7 may be used to comprise the raw material liquid delivery sections.

INDUSTRIAL APPLICABILITY

As described above, in accordance with the droplet formation method of the mixed liquid and the droplet formation device of the mixed liquid according to the present invention, even though the quantity is a trace, the droplets of a number of mixed liquids where the components are uniformly distributed can be quickly and regularly arranged at a predetermined position on a substrate.

For example, the droplet formation method of the mixed liquid and the droplet formation device of the mixed liquid according to the present invention can be applied to drug discovery and disease diagnosis where drug screening is performed and analytical chemistry technology in the fields which require a treatment of mixing liquids containing different specimens in combinatorial chemistry or the like to thereby facilitate the downsizing of the working scale required for the aforementioned treatments. As a result, this allows the relevant industries to facilitate effective utilization of specimens, high efficiency of working, improvement of safety and reduction of costs.

The invention claimed is:

1. A droplet formation device of a mixed liquid, comprising:
   - a raw material liquid delivery section having a plurality of capillaries each of which stores therein one of a plurality of raw material liquids for forming a droplet of the mixed liquid;
   - a substrate which is disposed opposite to the tips of said each capillary and on which the droplet of said mixed liquid formed from two or more of said plurality of raw material liquids each delivered from the tip of its associated capillary is mounted,
   - a voltage applying device electrically connected to the raw material liquid delivery section and the substrate and configured so that a pulse voltage is independently applied to each of the two or more of said raw material liquids, each raw material liquid respectively stored in it's respective capillary, and
   - a controller which controls said voltage applying device so that the applied voltage to be applied to at least one of the raw material liquids and the applied voltage to be applied to those of other raw material liquids are adjusted so as to be different from each other in order to control the composition ratio of the mixed liquid forming the droplet,
   wherein the plurality of said capillaries are arranged symmetrically around one of said capillaries,
   wherein said controller is configured to control said pulse voltage applying device and the application start timing so as to first start the application of said pulse voltage to said raw material liquid stored in at least one capillary out of said plurality of capillaries, and to subsequently start the application of said pulse voltage to each of said other raw material liquid before or after the first application of the pulse voltage is finished, and
   wherein the pulse voltage is first applied to the at least one capillary arranged at the center of said plurality of capillaries.

* * * * *